(12) United States Patent
Miki

(10) Patent No.: US 7,542,077 B2
(45) Date of Patent: Jun. 2, 2009

(54) WHITE BALANCE ADJUSTMENT DEVICE AND COLOR IDENTIFICATION DEVICE

(75) Inventor: Takanori Miki, Kanagawa (JP)

(73) Assignee: Eastman Kodak Company, Rochester, NY (US)

( * ) Notice: Subject to any disclaimer, the term of this patent is extended or adjusted under 35 U.S.C. 154(b) by 546 days.

(21) Appl. No.: 11/257,550

(22) Filed: Oct. 25, 2005

(65) Prior Publication Data

US 2006/0232684 A1 Oct. 19, 2006

(30) Foreign Application Priority Data

Apr. 14, 2005 (JP) ............... 2005-117456

(51) Int. Cl.
*H04N 5/76* (2006.01)
*H04N 5/222* (2006.01)
*G06K 9/00* (2006.01)

(52) U.S. Cl. ............... 348/223.1; 348/370; 382/167
(58) Field of Classification Search ............ 348/223.1, 348/226.1, 229.1, 222.1, 370, 371; 382/167
See application file for complete search history.

(56) References Cited

U.S. PATENT DOCUMENTS 6,727,942 B1 * 4/2004 Miyano ............... 348/223.1
6,727,943 B1 * 4/2004 Juen ................. 348/223.1
6,906,744 B1 * 6/2005 Hoshuyama et al. ..... 348/223.1
7,009,641 B2 * 3/2006 Takahashi ............ 348/223.1
7,081,920 B2 * 7/2006 Sugiki ............... 348/223.1
7,362,356 B2 * 4/2008 Ikeda et al. .......... 348/223.1

FOREIGN PATENT DOCUMENTS

JP       2000092509        1/2000
JP        200092509     *  3/2008

* cited by examiner

*Primary Examiner*—Nhan T Tran
*Assistant Examiner*—Trung Diep
(74) *Attorney, Agent, or Firm*—Peyton C. Watkins

(57) ABSTRACT

The present invention is directed to improving the accuracy of white balance adjustment. An image input from an image capture device 10 is divided into blocks, and white balance gains are calculated from a representative value of each block. Prior to calculation of the representative value of each block, a color range determining circuit 13 determines whether each pixel included in each block belongs to a light source color range, or belongs to an apparent object color range. A representative value of that block is calculated from remaining pixels other than pixels determined to belong to the apparent object color range. Thus, by preventing the representative value from being affected by an object color, the accuracy of white balance gains is improved.

4 Claims, 8 Drawing Sheets

WHITE BALANCE ADJUSTMENT DEVICE AND COLOR IDENTIFICATION DEVICE

FIELD OF THE INVENTION

The present invention relates to a technique for adjusting the white balance of an image captured by an image capture device, such as a digital camera.

BACKGROUND OF THE INVENTION

In a digital camera or the like, automatic white balance adjustment is performed so that the color of a subject that is white under a given light source is reproduced as white. Available white balance adjustment methods include a method in which the balance of RGB components of a signal for each pixel is adjusted so that an average for an entire image represents an achromatic color. In another known technique, an image is divided into a plurality of blocks, an average value of RGB components is calculated for each block, only one or more blocks whose average values fall within a predetermined range are extracted, and the RGB components are adjusted so that an average value of RGB components for a group of the extracted blocks represents an achromatic color.

Further, Japanese Patent Laid-Open Publication No. 2000-92509 discloses a technique wherein an image is divided into a plurality of blocks, a representative value is calculated for each block, and representative values for all blocks are used to calculate white balance gain.

FIG. 12 is a block diagram showing the structure of a related-art white balance adjustment device. An image capture device 10, such as a digital camera, captures an image and outputs the captured image to a block-dividing circuit 12.

The block-dividing circuit 12 divides an input image into equal blocks. Each block contains "n by m" pixels. The block-dividing circuit 12 sequentially outputs the blocks to a representative value calculating circuit 14.

The representative value calculating circuit 14 calculates an average value of RGB components for n * m pixels constituting each block, and further calculates a representative value (Tl, Tg, Ti) from the block average value, by means of the following linear transformation:

$$\begin{pmatrix} Tl \\ Tg \\ Ti \end{pmatrix} = \begin{pmatrix} 1/4 & 1/2 & 1/4 \\ -1/4 & 1/2 & -1/4 \\ -1/2 & 0 & 1/2 \end{pmatrix} \begin{pmatrix} R \\ G \\ B \end{pmatrix} \quad (1)$$

where Tl represents the luminance of a block, and Tg and Ti represent the color difference of a block. The representative value calculating circuit 14 outputs the representative values (Tl, Tg, Ti) calculated for each block to a white balance evaluating circuit 16.

The white balance evaluating circuit 16 evaluates the reliabilities of the respective blocks, calculates weighting factors in accordance with the evaluated reliabilities, and outputs the weighting factors to a white balance gain calculating circuit 18. For example, the reliabilities are evaluated using experience-derived knowledge regarding various types of light sources. The higher the subject luminance, the smaller the value to which a weighting factor is set for a particular block (a block that is highly likely to be illuminated by a fluorescent lamp) using experience-derived knowledge that, when the luminance of a subject is extremely high, the light source is less likely to be a fluorescent lamp.

The white balance gain calculating circuit 18 calculates a white balance gain value by performing a weighted average using the representative values of the blocks, and the weighting factors calculated by the white balance evaluating circuit 16 from the reliabilities of the blocks. More specifically, white balance gains are calculated by the following equations:

$$\begin{pmatrix} RMix \\ GMix \\ BMix \end{pmatrix} = \begin{pmatrix} 1 & -1 & -1 \\ 1 & 1 & 0 \\ 1 & -1 & 1 \end{pmatrix} \begin{pmatrix} TlMix \\ TgMix \\ TiMix \end{pmatrix} \quad (2)$$

$$MaxMix = \max(RMix, GMix, BMix) \quad (3)$$

$Rgain = MaxMix/RMix$ $Ggain = MaxMix/GMix \quad (4)$ $Bgain = MaxMix/BMix$ where TlMix, TgMix, and TiMix represent weighted average values obtained from the representative values of the blocks. The value (RMix, GMix, BMix) calculated by the above equations represents the color of a light source illuminating the subject. The white balance gains Rgain, Ggain, and Bgain are adjusted so that the color obtained when light coming from an estimated light source is reflected from a white object is corrected to be gray (or, in other words, so that R=G=B is satisfied). The calculated gains are output from the white balance gain calculating circuit 18 to a white balance adjusting circuit 20.

The white balance adjusting circuit 20 multiplies RGB pixel values for each pixel included in an image input from the image capture device 10 by the respective gains calculated by the white balance gain calculating circuit 18, thereby adjusting the white balance of the image to output the result thereof.

However, the above-described related art technique involves a problem in that, because a representative value for each block is calculated using equation (1) based on an average value of RGB components obtained for all n * m pixels included in each block, when a certain color of an object present within a block differs from the color of a light source, the average value of the block will be influenced by the color of this object.

As an example, FIG. 13 shows a block 100, which is one of a plurality of blocks into which an image is divided. The block 100 includes n * m pixels, and a simple average of RGB components for all the pixels is calculated as the average value for this block. However, as shown in this figure, the block 100 includes an image 102 of a green leaf In such a case, because the background color and the green color are averaged, the resultant average value does not accurately indicate the color of a light source illuminating the block. As a result, there may arise a situation in which, although the light source should be determined as daylight, the light source can be erroneously determined as a fluorescent lamp.

As described, related-art techniques do not always provide sufficient measures for estimating the color of an actual light source in cases where an object of a chromatic color is present within a block, or in cases where a state within a block is not uniform (for such cases, although the reliability of each block can be used to lower the unwanted influence, this requires accurate evaluation of the reliability), and this failure to provide sufficient measures has been a factor causing reduced accuracy of white balance adjustment.

An objective of the present invention is to provide a device that is capable of performing white balance adjustment reliably even in cases where an object of a chromatic color is present within a block, or cases where a state within a block is not uniform.

SUMMARY OF THE INVENTION

According to one aspect of the present invention, there is provided a white balance adjustment device for adjusting white balance of an input image, the white balance adjustment device comprising dividing means for dividing an input image into a plurality of blocks; determining means for determining, from a color difference of each pixel included in each of the blocks, whether or not each pixel is of an object color; representative value calculating means for calculating a representative value for each of the blocks from remaining pixels that are obtained by excluding, from pixels included in each of the blocks, pixels determined as a pixel of an object color; and gain calculating means for calculating white balance gains from the representative values calculated for all the blocks.

According to the present invention, because a representative value of a block is calculated from, instead of an average of all pixels included in that block, an average of remaining pixels that are obtained by excluding, from all the pixels included in the block, pixels determined as a pixel of an object color, an object color can be prevented from affecting the representative value of the block.

Further, according to another aspect of the present invention, there is provided a white balance adjustment device for adjusting white balance of an input image, the white balance adjustment device comprising dividing means for dividing an input image into a plurality of clusters on the basis of chromaticities of pixels of the input image; representative value calculating means for calculating a representative value for each of the clusters; determining means for determining, on the basis of the representative value, whether or not each cluster is of an object color; and gain calculating means for calculating white balance gains from representative values of remaining clusters that are obtained by excluding, from all the clusters, clusters determined to be of an object color.

According to the present invention, an input image is not divided into blocks of a predetermined size, but is divided into clusters on the basis of chromaticities of pixels. Each cluster can be defined as a group of pixels having the same color. Because a representative value of each cluster is calculated, and white balance gains are calculated from representative values of remaining clusters other than clusters whose representative values represent an object color, the influence of an object color can be eliminated.

Thus, according to the present invention, accuracy of white balance adjustment can be improved, and high image quality can be obtained.

BRIEF DESCRIPTION OF THE DRAWINGS

Preferred embodiments of the present invention will be described in further detail by reference to the following drawings, wherein.

DETAILED DESCRIPTION OF THE INVENTION

Preferred embodiments of the present invention will be described below with reference to the drawings.

Figure 1:
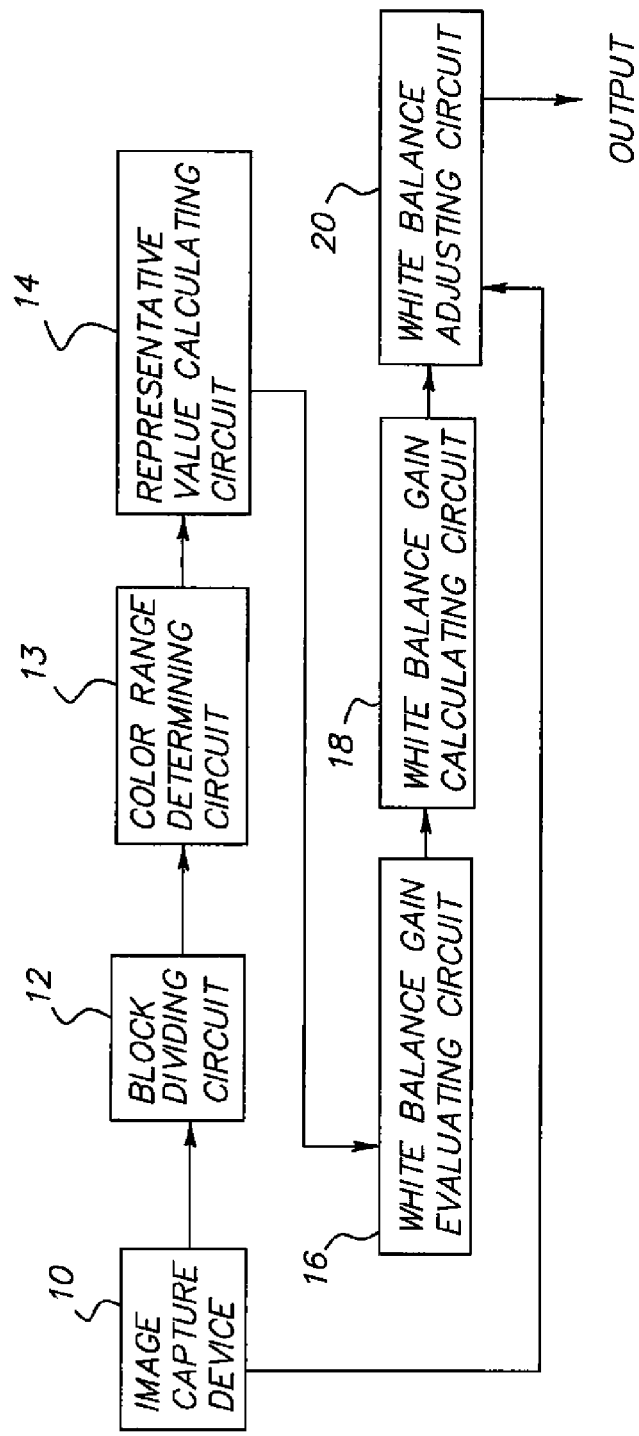
FIG. 1 is a block diagram showing the structure of a first embodiment of the present invention.
Figure 12:
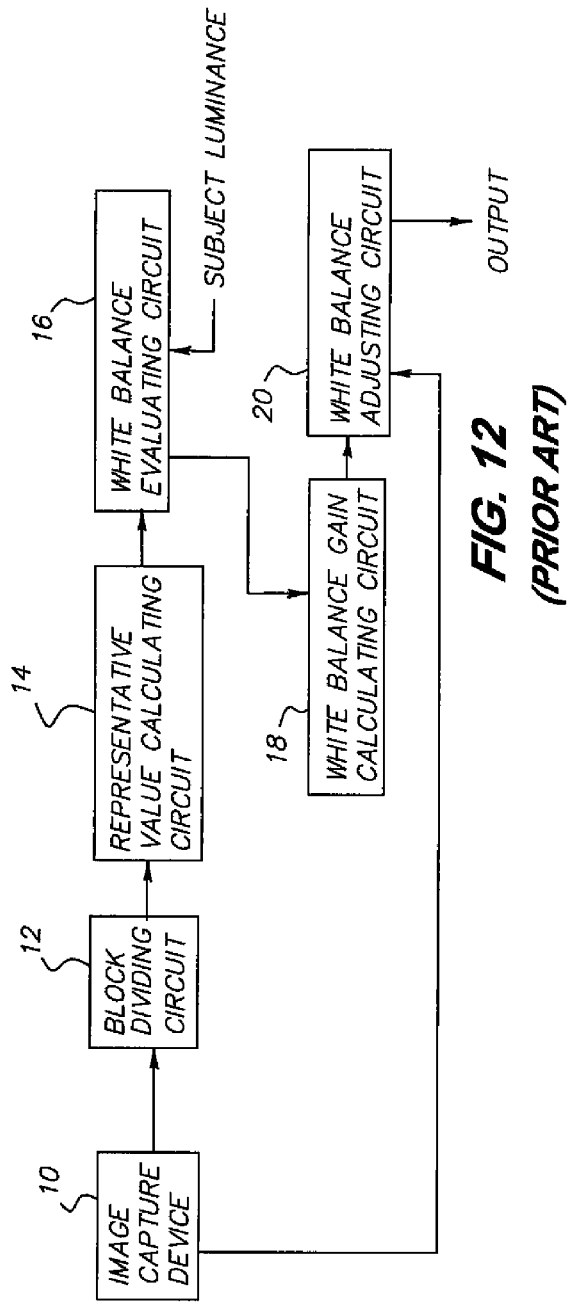
FIG. 12 is a block diagram showing the structure of a related art device.

FIG. 1 is a block diagram showing the structure of a white balance adjustment device according to a first embodiment of the present invention. The white balance adjustment device according to the present embodiment may be incorporated in a digital camera, in the form of an image processing IC having a processor and a memory. In contrast to the structure of the related-art white balance adjustment device shown in FIG. 12, a color range determining circuit 13 is provided prior to the representative value calculating circuit 14.

The block-dividing circuit 12 divides an image input from the image capture device 10 into a plurality of equal blocks, and sequentially outputs the blocks to the color range determining circuit 13.

The color range determining circuit 13 determines, from a color difference of each pixel of the n*m pixels constituting each block, whether or not each pixel is of an apparent object color, and distinguishes a pixel of an apparent object color from other pixels. The color range determining circuit 13 identifies, for all the blocks, each pixel included in each block, and outputs results obtained by identification to the representative value calculating circuit 14. The results obtained by identification may be indicated by, for example, setting a certain flag on a pixel of an apparent object color.

Although the representative value calculating circuit 14 calculates a representative value for each block in basically the same manner as in the related-art circuit, the representative value calculating circuit 14 according to the present embodiment does not use an average value of all pixels constituting each block as used in the related art circuit to calculate a representative value for each block, but uses an average value of only remaining pixels other than pixels identified as a pixel of an apparent object color to calculate a representative value for each block. The representative value for each block is calculated using equation (1). The present embodiment differs from the related-art device in that the value (R, G, B) is not an average value of all pixels, but is an average value of pixels that are not identified as a pixel of an apparent object color. The representative value calculating circuit 14 outputs to the white balance evaluating circuit 16 a representative value calculated for each block. The subsequent processes are performed as described with reference to FIG. 12. A weighted average is obtained from the representative values of the blocks, and white balance gains (Rgain, Ggain, and Bgain) are then calculated from the weighted average value by further applying equations (2) to (4). In the present embodiment, because the representative values are calculated after eliminating a pixel of an apparent object color from each block, and the white balance gains are calculated from these representative values, the process is performed on the assumption that each block itself does not necessarily have an achromatic color, but a weighted average of the representative values of the blocks represents an achromatic color. Therefore, even in cases where no achromatic color is present within an input image, appropriate white balance gains can be calculated. Further, because an average value of remaining pixels in each block is used as a representative value of that block, noise within each block can be absorbed.

The processing performed by the color range determining circuit 13 will be more specifically described below.

Figure 2:
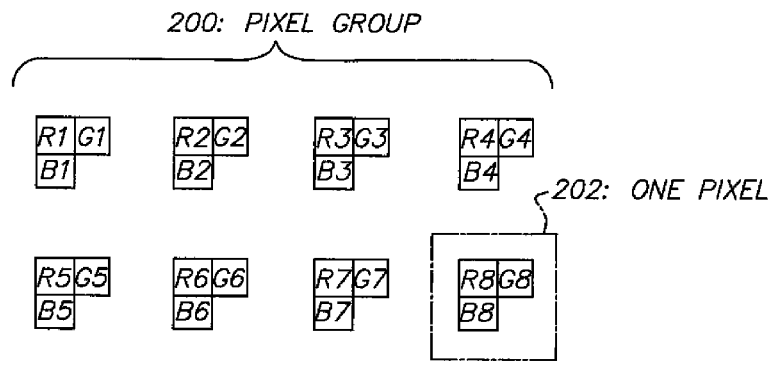
FIG. 2 is a diagram showing an arrangement of pixels included in an input image.

FIG. 2 shows an example of a pixel group constituting each block input from the block-dividing circuit 12. Each pixel group 200 constituting a block includes an R pixel component, a G pixel component, and a B pixel component. In the present embodiment, an R pixel component, a G pixel component, and a B pixel component are grouped to form one pixel 202. The color range determining circuit 13 calculates a color difference (Tg, Ti) from pixel component values representing an R pixel component, a G pixel component, and a B pixel component included in each pixel. The color difference can be calculated by equation (1) from R, G, B pixel component values of each pixel for the value (R, G, B).

Figure 3:
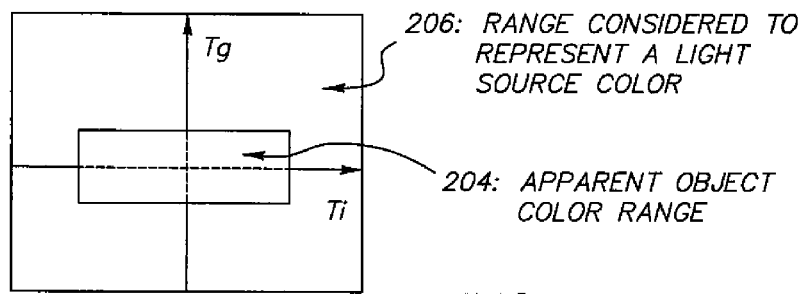
FIG. 3 is an illustrative diagram showing a light source color range and an apparent object color range on a color difference plane.

FIG. 3 shows a color difference plane (Ti-Tg plane). In general, a color range 204 that is considered to represent a light source color and a color range 206 that is considered to represent an apparent object color can be unequivocally set on the color difference plane. The color range 204 that is considered to represent a light source color is set to cover a rectangular area having magnitudes of Ti and Tg equal to or less than respective predetermined values, and the color range 206 that is considered to represent an apparent object color is set to cover an area having magnitudes of Ti and Tg greater than the respective predetermined values. The color range determining circuit 13 uses a memory in which the color ranges 204 and 206 shown in FIG. 3 are stored, and identifies which color range to which the color difference (Tg, Ti) calculated for each pixel included in each block belongs. When the predetermined values are respectively set to Tith and Tgth, if a color difference (Tga, Tia) calculated for a certain pixel included in a certain block has the value Tga greater than the value Tgth, and has the value Tia greater than the value Tith (if the conditions "Tga>Tgth" and "Tia>Tith" are both satisfied), that pixel is identified as a pixel that falls within the color range 206 that is considered to represent an apparent object color.

The term "achromatic color" as used herein refers to the color of an object having an approximately constant (flat) reflectivity regardless of wavelength in terms of spectral reflectivity, and the color of light obtained when light coming from a light source is reflected by this object is considered to represent the color of the light source. When viewed on the color difference plane, the achromatic color varies depending on the source of light, such as daylight, a fluorescent lamp, or tungsten light. The light source color range 204 shown in FIG. 3 is set as a range within which the achromatic color may vary under various types of light sources. On the other hand, the term "apparent object color" as used herein refers to the color of an object having a non-flat spectral reflectivity. Although it is to be understood that, if the light source is changed, the spectral reflectivity distribution of this object will change, the color difference of an apparent object color never belongs to the above-described light source color range 204 even if the light source is changed. In other words, colors whose color difference may fall within the light source color range 204 when the light source is changed are excluded from the "apparent object color" of the present embodiment. However, the light source color range 204 and the apparent object color range 206 may have a gray zone therebetween. The process regarding a gray zone is performed as will be described below.

Figure 4:
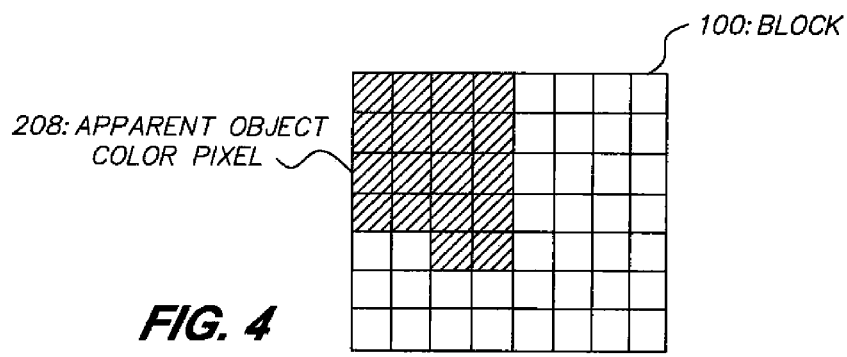
FIG. 4 is an illustrative diagram showing a result of processing.
Figure 13:
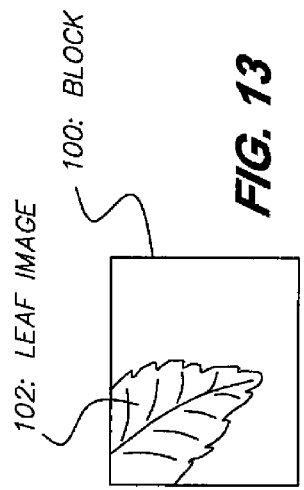
FIG. 13 is an illustrative diagram showing a block including an image of a leaf.

FIG. 4 schematically shows a result obtained by determination performed on a certain block 100 by the color range determining circuit 13. Among the pixels included in the block 100, the pixels diagonally shaded in this diagram are those determined to belong to the color range 206 that is considered to represent an apparent object color, or, in other words, those identified as an apparent object color pixel 208. In order to calculate the representative value of this block 100, an average value of pixel values of the remaining pixels other than the diagonally shaded pixels is calculated, and the average value thus calculated is used to calculate the representative value of the block 100 according to equation (1). Because the average value is calculated after eliminating the apparent object color pixels 208, the influence of an apparent object color is eliminated, and the representative value thus obtained accurately indicates the color of the light source. For example, if the present embodiment is described with reference to FIG. 13, after a group of pixels forming an image 102 of a green leaf are eliminated, only a group of the remaining pixels is used to calculate an average value, and this average value is used to calculate the representative value of the block 100.

Figure 5:
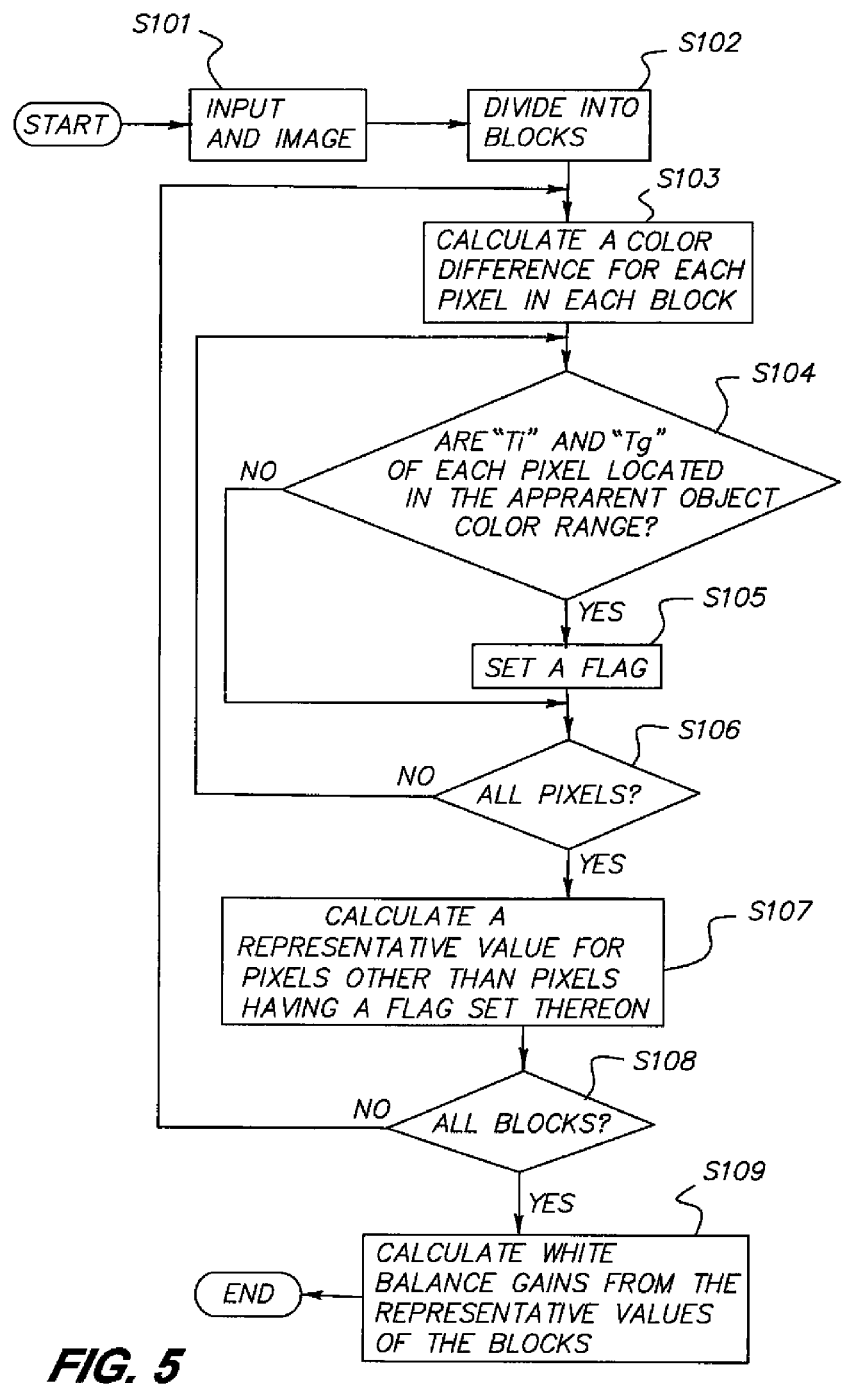
FIG. 5 is a flowchart of operations according to the first embodiment.

FIG. 5 shows a processing flowchart according to the present embodiment. First, when an image is input (S101) from the image capture device 10, the image is divided (S102) into blocks having a predetermined size. The size of a block may be determined as desired. The blocks are sequentially input, and, in each block, color differences (Tg, Ti) are calculated (S103) from pixel values (R, G, B) of pixels included in that block according to equation (1). The calculated color differences (Tg, Ti), which are associated with information identifying the corresponding pixels, such as a pixel number or pixel coordinates, are stored in a memory.

After a color difference (Tg, Ti) is calculated for a target pixel, a determination is made (S104) as to whether or not the color difference (Tg, Ti) belongs to the preset apparent object color range 206. More specifically, as described above, a determination is made as to whether the values of the color difference are greater or less than the respective thresholds Tgth and Tith that distinguish between the light source color range 204 and the apparent object color range 206. When the color difference (Tg, Ti) of the target pixel is determined to belong to the apparent object color range 206, the pixel is stored in the memory after setting a flag thereon (S105). On the other hand, when the color difference (Tg, Ti) of the target pixel is determined not to belong to the apparent object color range 206, no flag is set on that pixel. The steps described above are repeatedly performed on all pixels included in each of the blocks (S106). Then, after the steps have been performed on all pixels within a certain block, pixels other than pixels having a flag set thereon are read from the memory, an average value of pixel values of the read pixels is calculated, and a representative value of that block is calculated (S107) from the calculated average value as the value (R, G, B)

according to equation (1). The steps described above are performed on all the blocks to calculate respective representative values of all the blocks (S108). After the representative values of all the blocks have been calculated, white balance gains are calculated (S109) from the representative values of the blocks according to the equations (2) to (4). The pixel values of the pixels included in the image input from the image capture device 10 are multiplied by the calculated white balance gains to thereby adjust the white balance of the image.

Figure 6:
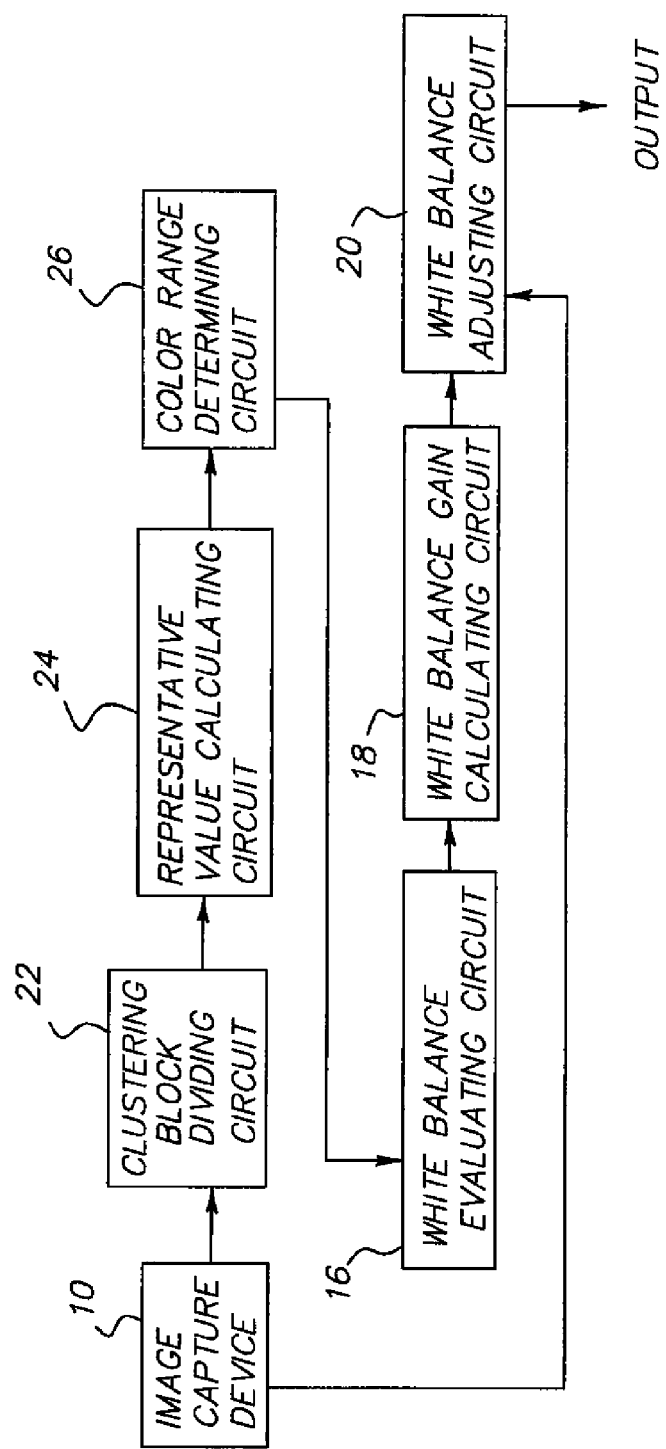
FIG. 6 is a block diagram showing the structure of a second embodiment of the present invention.

FIG. 6 is a block diagram showing the structure of a second embodiment of the present invention. Although in the first embodiment the block-dividing circuit 12 divides an input image into blocks of a predetermined size, in the present embodiment, pixels included in an image are dynamically clustered in accordance with the chromaticities of the pixels. For this purpose, a clustering block-dividing circuit 22, a representative value calculating circuit 24, and a color range determining circuit 26 are provided prior to the white balance evaluating circuit 16.

An image captured by the image capture device 10 is input to the clustering block-dividing circuit 22, in which pixels included in the image are clustered on the basis of chromaticities of the pixels. In other words, adjacent pixels having identical chromaticities are sequentially grouped (labeled with the same label) so that an area of uniform chromaticity is defined. Respective clustered areas are sequentially numbered and stored in a memory. The clustering block-dividing circuit 22 outputs, to the representative value calculating circuit 24, the pixels grouped into respective clusters.

The representative value calculating circuit 24 calculates an average value of pixels included in each cluster, and calculates a representative value of that cluster from the calculated average value (R, G, B) according to equation (1). After the representative value calculating circuit 24 calculates representative values of all the clusters, the calculated representative values are output to the color range determining circuit 26.

As in the color range determining circuit 13 shown in FIG. 1, the color range determining circuit 26 uses the light source color range 204 and the apparent object color range 206 as shown in FIG. 3 that are stored in a memory in the form of a map, and determines whether or not a color difference (Tg, Ti) of a representative value calculated for each cluster belongs to the apparent object color range 206. After the color range determining circuit 26 determines, for all the clusters, whether or not each cluster is of an apparent object color, only representative values of remaining clusters other than those of an apparent object color are output to the white balance evaluating circuit 16. The subsequent processes are performed as described with reference to FIG. 1. Thus, in the present embodiment, calculation of white balance gain takes into account only representative values of clusters belonging to the light source color range 204.

Figure 7:
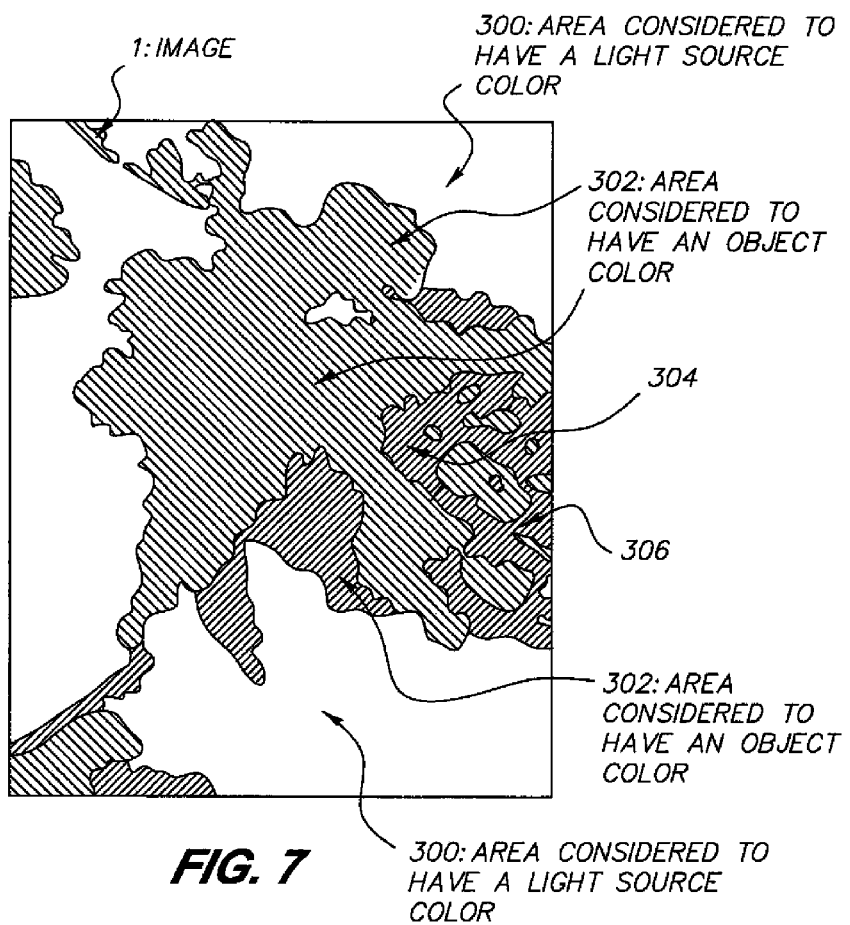
FIG. 7 is an illustrative diagram showing a clustering process.

FIG. 7 schematically shows processing performed by the clustering block-dividing circuit 22, the representative value calculating circuit 24, and the color range determining circuit 26. The chromaticity of each pixel constituting an input image 1 is calculated and sequentially stored in a memory. Pixels having identical chromaticities are labeled with the same label and clustered. It should be noted that, although FIG. 7 is shown in black and white for convenience of illustration, an actual image includes clusters of, for example, red, green, orange, yellow, or other colors. As an example, FIG. 7 shows clusters 300, 302, 304, and 306. All pixels constituting the cluster 300; that is, the pixels labeled with the same label, are read from the memory, an average value (R, G, B) thereof is calculated, and a representative value of the cluster 300 is calculated according to equation (1). A determination is made as to whether or not the color difference (Tg, Ti) of the representative value belongs to the apparent object color range 206, and, when the color difference (Tg, Ti) does not belong to the apparent object color range 206, the cluster is identified as a light source color area 300. Similarly, all pixels constituting the cluster 302 are read from the memory, an average value (R, G, B) thereof is calculated, and a representative value of the cluster 302 is calculated according to equation (1). A determination is made as to whether or not the color difference (Tg, Ti) of the representative value belongs to the apparent object color range 206, and, when the color difference (Tg, Ti) belongs to the apparent object color range 206, the cluster is identified as an apparent object color area 302.

Meanwhile, the cluster 304 has a chromaticity corresponding to an orange color, and is located in a boundary area, or a gray zone, between the apparent object color range 206 and the light source color range 204. If the chromaticity is solely used to determine whether or not the cluster 304 belongs to the apparent object color range 206, because the chromaticity represents an orange color, the cluster may be identified as a light source color area produced by a tungsten lamp. However, because the apparent object color area 302 surrounds the periphery of the cluster area 304, the cluster area 304 is also determined to be an apparent object color area. Likewise, the cluster 306 is located in a gray zone between the apparent object color range 206 and the light source color range 204, and, if the chromaticity is solely used to determine whether or not the cluster 306 belongs to the apparent object color range 206, because the chromaticity represents a yellow-green color, the cluster may be identified as a light source color area produced by a fluorescent lamp. However, because a cluster having similar chromaticity and identified as the apparent object color area 302 exists on the periphery of the cluster 306, the cluster 306 is also determined to be an apparent object color area.

As described above, in cases where difficulty is encountered in identifying whether a target cluster is a light source color area or an apparent object color area, the target cluster can be accurately identified by determining the following:

(1) Whether a cluster having a similar chromaticity exists on the periphery of the target cluster.

(2) Whether the cluster having a similar chromaticity is a light source color area or an apparent object color area.

In other words, in cases where a certain cluster is difficult to identify, or, more specifically, in cases where the values of the color difference (Tg, Ti) of that cluster are close to the respective thresholds (Tgth, Tith) (a difference therebetween falls within a predetermined margin of error), when a cluster having a similar chromaticity exists on the periphery of the target cluster, and when the cluster having a similar chromaticity is an apparent object color area, the target cluster is also identified as an apparent object color area, and, when the cluster having a similar chromaticity is not an apparent object color area, the target cluster is also identified as a light source color area. When no cluster having a similar chromaticity exists on the periphery of the target cluster, or when a plurality of clusters having similar chromaticities exist on the periphery of the target cluster, and the results obtained by identification performed for the respective clusters are mutually different, it is possible to desirably select which type of area as which the target cluster should be identified. For example, the target cluster may be identified as an apparent object color area. As an example, an algorithm for identifying a target cluster located in a gray zone as an apparent object color area will be described below:

(a) When a cluster having a similar chromaticity and already identified as having an apparent object color exists adjacent to a target cluster, the target cluster is identified as an apparent object color area.

(b) When no cluster having a similar chromaticity and already identified to have an apparent object color exists adjacent to a target cluster, and when a cluster already identified to have an apparent object color surrounds the periphery of the target cluster, the target cluster is identified as an apparent object color area.

Figure 8:
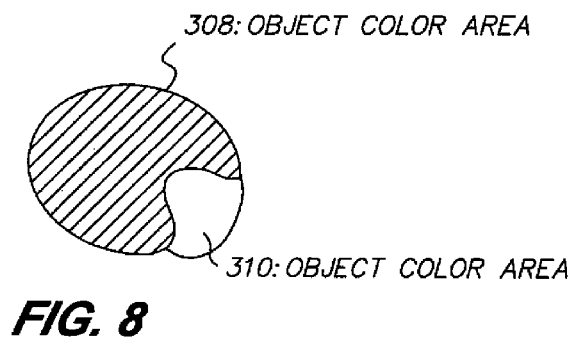
FIG. 8 is an illustrative diagram showing an identification process for a gray zone.

FIG. 8 schematically shows the above-described process performed for a gray zone. In this example, a target cluster 310 has a color difference located in a gray zone on a color difference plane, and an object color area 308 exists on the periphery of the cluster 310, or adjacent to the cluster 310. Although the cluster 310 cannot be identified in isolation from others, because the object color area 308 exists adjacent to the cluster 310, the cluster 310 and the object color area 308 are compared in chromaticity. When a difference in chromaticity therebetween falls within a predetermined tolerance level, the cluster 310 is identified as an object color area 310, as shown in FIG. 8. When a difference in chromaticity therebetween exceeds the predetermined tolerance level, a determination is made as to whether or not an object color area surrounds the periphery of a target cluster, and, also when an object color area surrounds the periphery of a target cluster, the target cluster is identified as an object color area.

Figure 9:
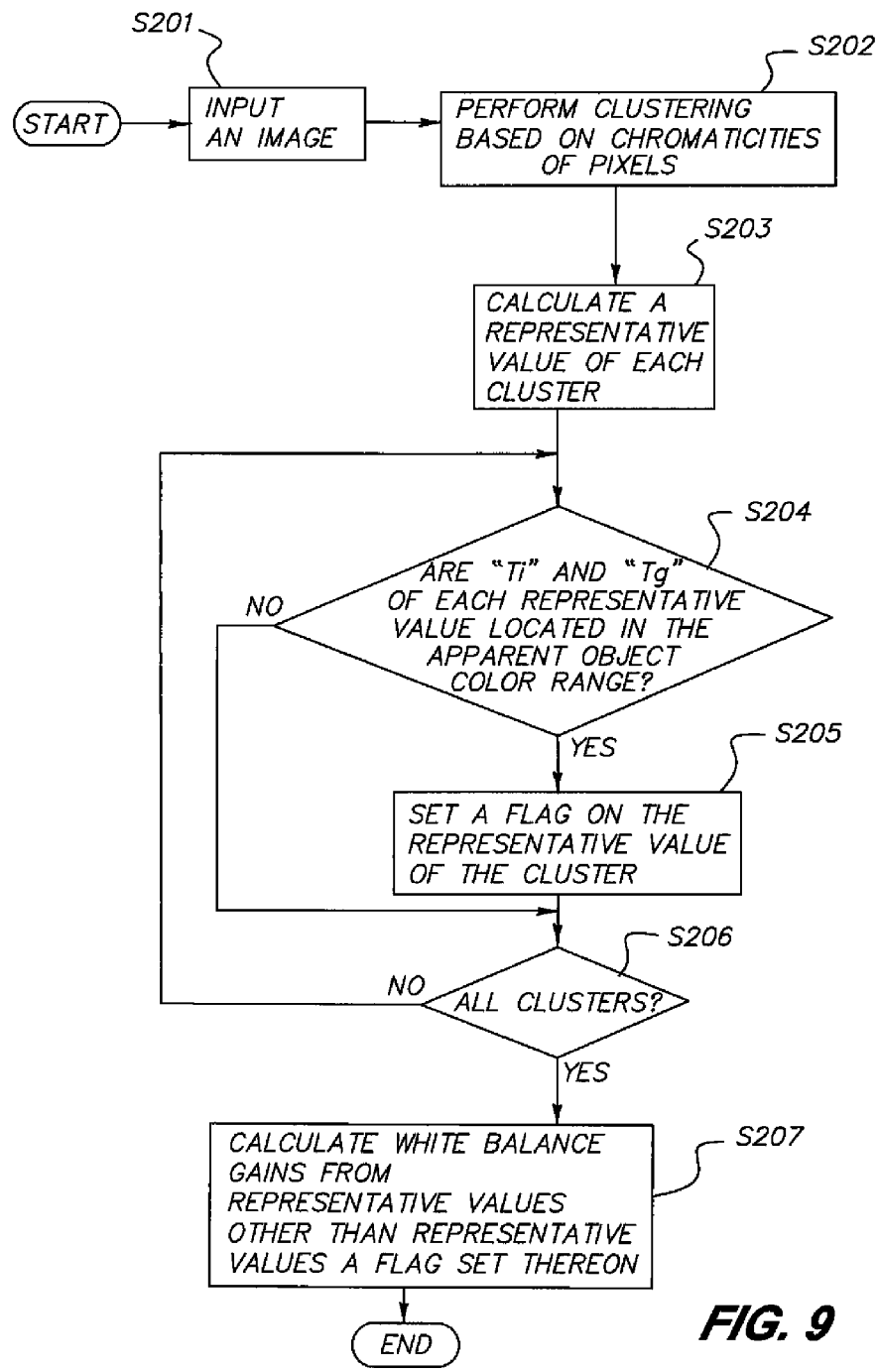
FIG. 9 is a flowchart of operations according to the second embodiment.

FIG. 9 shows a flowchart of processing according to the present embodiment. When an image is input (S201) from the image capture device 10, the image is not divided into blocks, but a chromaticity is calculated for each pixel included in the input image, and a group of pixels having identical chromaticities are grouped to form a cluster (S202). Clustering is a well-known technique in computer-based image processing. A chromaticity of a certain pixel is calculated, the calculated chromaticity is compared with the chromaticity of an adjacent pixel, and, when the chromaticities are identical, these pixels are labeled with the same label. The above process is performed for all pixels, and a group of pixels labeled with the same label is numbered as one cluster, and is stored in a memory. For example, cluster 1 includes pixels 1, 2, and 3, and cluster 2 includes pixels 4, 5, 6, and 7. After clustering is completed, pixel values of pixels included in each cluster are used to calculate a representative value of that cluster (S203). More specifically, an average value of pixels included in a cluster is calculated, and the calculated average value is used to calculate a luminance Tl and a color difference (Tg, Ti) of that cluster according to equation (1).

After a representative value (Tl, Tg, Ti) of a cluster is calculated, the color difference (Tg, Ti) of the representative value is compared with the light source color range 204 and the apparent object color range 206 (refer to FIG. 3) that are preset on a color difference plane, and a determination is made (S204) as to whether or not the color difference belongs to the apparent object color range 206. When the color difference belongs to the apparent object color range 206, a flag is set (S205) for the cluster. When the color difference does not belong to the apparent object color range 206, no flag is set for the cluster.

When, in the determination step in S204, the color difference (Tg, Ti) of a target cluster is located near a boundary (or, in a gray zone) between the light source color range 204 and the apparent object color range 206, a determination is made as to whether or not a cluster having a similar chromaticity and identified as an apparent object color area exists adjacent to the target cluster. When such a cluster exists adjacent to the target cluster, the target cluster is also identified as belonging to the apparent object color range, and a flag is set thereon. On the other hand, when such a cluster does not exist adjacent to the target cluster, a determination is made as to whether or not the periphery of the target cluster is surrounded by an apparent object color area, and, when the periphery of the target cluster is surrounded by an apparent object color area, the target cluster is also identified as belonging to the apparent object color range, and a flag is set thereon. A gray zone having a predetermined width may be provided on a boundary between the light source color range 204 and the apparent object color range 206 shown in FIG. 3. When the color difference of a cluster is located in this gray zone, processing proceeds to the above-described determination step.

The above process is repeatedly performed (S206) for all clusters, and, after all clusters have been identified, representative values of remaining clusters other than clusters having a flag set thereon are used to calculate the white balance gain (S207).

Also in the present embodiment, because clusters identified as having an apparent object color are excluded from calculation of the white balance gain, the accuracy of white balance adjustment can be improved.

Although the present embodiment is described for cases where a cluster located in a gray zone is to be identified, a similar process may be performed for each pixel by the color range determining circuit 13 according to the first embodiment. For example, when, on the basis of the color difference of each pixel, a determination is made as to whether each pixel belongs to the light source color range 204, or belongs to the apparent object color range 206, when the periphery of a target pixel is surrounded by an apparent object color pixel, the target pixel is also identified as an object color pixel.

Although in the above-described embodiments the color range map shown in FIG. 3 is used to determine whether or not each pixel or each cluster belongs to the apparent object color range 206, the present invention is not limited to such embodiments. By further setting a color difference range unique to a particular object, and determining whether or not each pixel or each cluster belongs to such a particular range, the accuracy of identification can be improved.

Figure 10:
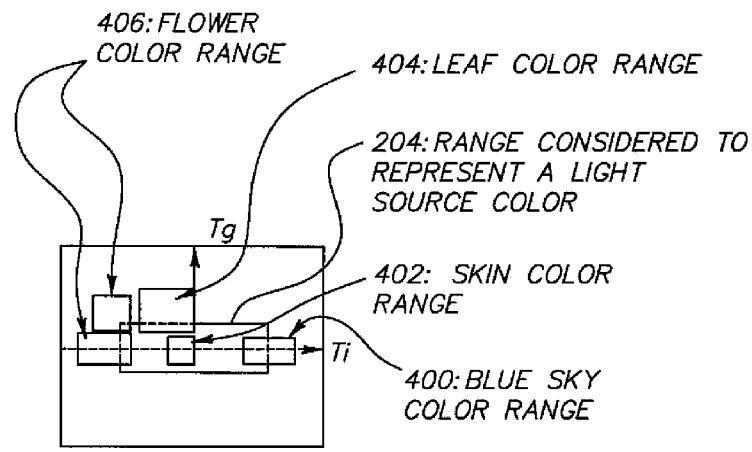
FIG. 10 is an illustrative diagram showing particular color ranges.

FIG. 10 shows an example of particular color ranges. As such particular ranges, a blue sky color range 400, a skin color range 402, a leaf color range 404, and a flower color range 406 are mapped on a color difference plane. When the color difference of a cluster belongs to one of those particular color ranges, the cluster is identified as an apparent object color area. For example, when the color difference of a certain cluster belongs to the leaf color range 404 or the flower color range 406, the cluster is identified as an apparent object color area. Even when a cluster exists in a gray zone, when the cluster belongs to one of those particular color ranges, the cluster is identified as an apparent object color area. Thus, such clusters can be excluded from calculation of the white balance gain.

Although in the third embodiment the identification accuracy is increased by mapping particular color ranges on a color difference plane, and by determining whether or not the color difference of a cluster belongs to one of these particular color ranges, it should be noted that the identification accuracy depends on the accuracy achieved in mapping each particular color range. For example, the particular color ranges include the skin color range 402 and the leaf color range 404 as shown in FIG. 10. The identification accuracy is improved as the number of particular color ranges is increased, whereas the greater the degree of subdivision of the particular color ranges, the more difficulty is encountered in precisely mapping the particular color ranges.

Therefore, according to the fourth embodiment, a positional relationship of a subject of a certain particular color range is used to estimate a precise mapping position of another particular color range.

Figure 11:
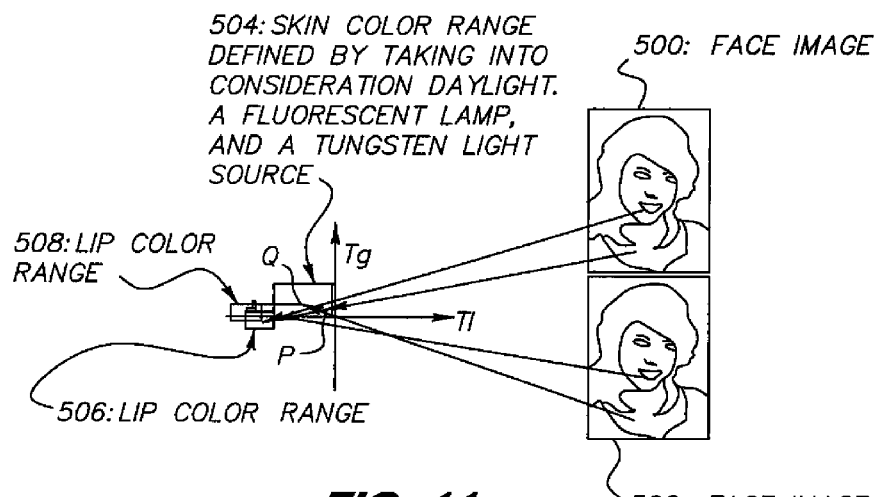
FIG. 11 is an illustrative diagram showing a position adjustment process for particular color ranges.

FIG. 11 schematically shows the process according to the present embodiment. As shown, images of a face of a person are used as a subject for mapping correction. The face images include portions corresponding to the eyes, and portions corresponding to the lips. In this figure, two face images 500 and 502 having different white balance settings are shown as an example. The color differences of a skin color portion and a lip portion of the face image 500 and the color differences of a skin color portion and a lip portion of the face image 502 are respectively different. On the other hand, a skin color range 504 defined by taking into consideration daylight, a fluorescent lamp, and a tungsten light source is mapped on a color difference plane. The color difference of the skin color portion of the face image 500 is located somewhere within the skin color range 504 (such as at position P), and, similarly, the color difference of the skin color portion of the face image 502 is also located somewhere within the skin color range 504 (such as at position Q). However, these color differences are located at different positions within the skin color range 504, because the original images have different white balance settings. Because a lip portion is present in a skin color portion, when the color differences of the skin color portions are located at different positions, the color differences of the lip portions should also be located at different positions. Therefore, as shown in FIG. 11, as the particular color ranges, lip color ranges are mapped such that a lip color range 506 is set in accordance with the position P in the skin color range 504, and such that a lip color range 508 is set in accordance with the position Q in the skin color range 504. In other words, the position of a lip color range is shifted as the position of the color difference of a skin color portion of an image changes in the skin color range 504. Specifically, a processor of an image processing IC is used to shift, in accordance with the amount of difference between a center position of the skin color range 504 stored in a memory and the position P (or the position Q) of the skin color portion, a default position of the lip color range stored in the same memory, and to store the thus shifted position again in the memory. As a result, the lip color range can be precisely mapped, and the accuracy in identifying whether or not a certain cluster is of a lip color is improved. FIG. 11 shows that the color difference of the lip portion of the face image 500 is located in the lip color range 506 defined on the color difference plane in accordance with the position P, and that the color difference of the lip portion of the face image 502 is located in the lip color range 508 defined on the color difference plane in accordance with the position Q. It is to be understood that, in cases where only the lip color range 506 is provided, accurate identification cannot be performed, because the color difference of the lip portion of the face image 502 is located outside the lip color range 506. Although in the above-described example case the particular color ranges are defined as the lip color ranges in accordance with the positions P and Q, the present invention is not limited to such cases, but can be similarly applied to other types of particular color ranges. For example, the present embodiment can be applied to an eye portion, which includes a portion corresponding to the black part of an eye, and a portion corresponding to the white part of the eye. The positions of particular color ranges for the portion corresponding to the white part having an achromatic color can be variably set in accordance with the positions P and Q. Further, in the case of an eye portion, by paying attention not only to the color difference, but also to the luminance difference between the white part and the black part of an eye, accuracy can be further improved.

What is claimed is:

1. A white balance adjustment device for adjusting white balance of an input image, the white balance adjustment device comprising:
    dividing means for dividing an input image into a plurality of blocks;
    determining means for determining, from a color difference of each pixel included in each of the blocks, whether or not each pixel is of an object color;
    excluding pixels determined to be a pixel of an object color from a representative value for each of the blocks for the white balance adjustment;
    representative value calculating means for calculating the representative value for each of the blocks, from remaining pixels that are obtained by excluding, from pixels included in each of the blocks, pixels determined to be a pixel of an object color; and
    gain calculating means for calculating white balance gains from the representative values calculated for all the blocks.

2. A white balance adjustment device according to claim 1, further comprising memory means for pre-storing a light source color range and an apparent object color range that we defined on a color difference plane, wherein
    when the color difference of a pixel included in the blocks belongs to the apparent object color range stored by the memory means, the determining means determines that the pixel is of an object color.

3. A white balance adjustment device according to claim 2 wherein:
    when the color difference to be determined is located near a boundary between the light source color range and the apparent object color range, the determining means performs determination on the basis of a result obtained by determination performed on a surrounding pixel.

4. A white balance adjustment device according to claim 2, wherein:
    the memory means further pre-stores a particular color range unique to a particular object, and
    when the color difference to be determined belongs to the particular color range stored by the memory means, the determining means determines that the pixel is of an object color.

* * * * *

UNITED STATES PATENT AND TRADEMARK OFFICE
CERTIFICATE OF CORRECTION

| | | |
|---|---|---|
| PATENT NO. | : 7,542,077 B2 | |
| APPLICATION NO. | : 11/257550 | |
| DATED | : June 2, 2009 | |
| INVENTOR(S) | : Takanori Miki | |

It is certified that error appears in the above-identified patent and that said Letters Patent is hereby corrected as shown below:

Column   Line

12   37   In Claim 2, delete "we" and insert --are--, therefor.

Signed and Sealed this
Third Day of May, 2011

David J. Kappos
*Director of the United States Patent and Trademark Office*